(12) United States Patent
Bendert et al.

(10) Patent No.: US 10,831,185 B2
(45) Date of Patent: Nov. 10, 2020

(54) ASSESSMENT OF INDUSTRIAL MACHINES

(71) Applicant: SOLAR TURBINES INCORPORATED, San Diego, CA (US)

(72) Inventors: Jonathan Bendert, San Diego, CA (US); Dia Bounsall, San Diego, CA (US); Nathan Shevlin, San Diego, CA (US); Chandrakanth Reddy Boppidi, San Diego, CA (US); Marco Ezra Leon, Jamul, CA (US); Per Robert Nordgren, San Diego, CA (US); Venkatesh Lingineni, San Diego, CA (US); Pier Paolo Piattini, Montagnola (CH); Francesc Diaz Trias, Sant Just Desvern (ES); Martin Rinak, Presov (SK); Karol Sykora, Kosice (SK); Martin Velgos, Kosice (SK); Alvaro Israel Camacho Macias, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 1000 days.

(21) Appl. No.: 15/381,017

(22) Filed: Dec. 15, 2016

(65) Prior Publication Data
US 2018/0173211 A1 Jun. 21, 2018

(51) Int. Cl.
G05B 23/02 (2006.01)
G01M 15/14 (2006.01)

(52) U.S. Cl.
CPC ..... *G05B 23/0227* (2013.01); *G05B 23/0272* (2013.01); *G05B 23/0283* (2013.01); *G01M 15/14* (2013.01)

(58) Field of Classification Search
CPC .................................................. G05B 23/0227
USPC .............................................................. 702/9
See application file for complete search history.

(56) References Cited

U.S. PATENT DOCUMENTS

| | | | | |
|---|---|---|---|---|
| 7,406,399 B2* | 7/2008 | Furem | ................ | G05B 23/0235 702/182 |
| 7,689,394 B2* | 3/2010 | Furem | .................. | E02F 9/2054 703/8 |
| 2005/0262236 A1* | 11/2005 | Schachtely | ........ | G05B 23/0227 709/224 |
| 2008/0247636 A1* | 10/2008 | Davis | ...................... | G06T 19/00 382/152 |
| 2010/0064235 A1* | 3/2010 | Walls | ................. | G05B 23/0267 715/763 |

(Continued)

*Primary Examiner* — Ricky Ngon
(74) *Attorney, Agent, or Firm* — Procopio, Cory, Hargreaves & Savitch LLP (57) ABSTRACT

The systems and methods disclosed herein include an assessment system and process for assessing an industrial machine and its various sections, sub-sections, and parts. In embodiments, the assessment system includes an assessment device that includes an assessment overviewer and a part assessor. The assessment overviewer provides an assessor with a selectable industrial machine schematic that illustrates the assessment status of each section of the industrial machine, such as by changing the appearance of each section based its assessment status. The part assessor provides a part assessment interface with engineering instructions and a part grading user interface that provides for a comparison of digital images to complete the part grading.

20 Claims, 4 Drawing Sheets

(56) References Cited

U.S. PATENT DOCUMENTS

| | | | |
|---|---|---|---|
| 2010/0217554 A1* | 8/2010 | Knight | G06Q 10/20 702/84 |
| 2017/0160733 A1* | 6/2017 | Oostendorp | G06Q 50/04 |

* cited by examiner

ASSESSMENT OF INDUSTRIAL MACHINES

TECHNICAL FIELD

The present disclosure generally pertains to industrial machines, and is directed toward an assessment process and system for assessing the condition of the industrial machine and its components.

BACKGROUND

The operating conditions of industrial machines, such as gas turbine engines and gas compressors, may result in, inter alia, wear, corrosion and fatigue damage. The components of the industrial machines are often assessed to determine the condition of each component of the industrial machine.

The present disclosure is directed toward overcoming one or more of the problems discovered by the inventors or that is known in the art.

SUMMARY OF THE DISCLOSURE

A system and process for assessing an industrial machine is disclosed. In one aspect of the invention, the process includes a part assessor of the assessment device displaying a part assessment interface for a selected part to the assessor in a user interface of the assessment device. The part assessment interface includes engineering instructions and a part grading user interface. The part grading user interface includes a part image window that displays an image if the selected part obtained by the part assessor from an image collector of the assessment device, grading comparison images that illustrate grading levels for the selected part, and grading level identifiers that identify the grading level of each of the grading comparison images. The part assessor receives inputs from the assessor including measurements of the selected part requested by the engineering instructions and a part grade selection determined by comparing the image of the selected part with the grading comparison images. The process also includes an assessment report generator of the assessment system generating an assessment report after the assessment of the industrial machine is completed. The assessment report generator uses the measurements and grading selections received from the assessor, and the images obtained from the image collector to generate the assessment report. The assessment report generator provides recommendations on whether to replace the parts assessed in the assessment report.

In another aspect of the invention, the assessment system includes an assessment device and an assessment report generator. The assessment device includes a user interface, a part assessor, and an image collector. The part assessor displays a part assessment interface for a selected part to the assessor in the user interface. The part assessment interface includes engineering instructions and a part grading user interface. The part grading user interface includes a part image window that displays an image of the selected part, grading comparison images that illustrate grading levels for the selected part, and grading level identifiers that identify the grading level of each of the grading comparison images. The part assessor receives inputs from the assessor including measurements of the selected part requested by the engineering instructions and a part grade selection determined by comparing the image of the selected part with the grading comparison images. The image collector obtains the image of the selected part and provides the image to the part assessor. The assessment report generator generates an assessment report after the assessment of each section of the industrial machine is completed. The assessment report generator uses the measurements and grading selections received from the assessor, and the images obtained from the image collector to generate the assessment report. The assessment report generator provides recommendations on whether to replace the parts assessed in the assessment report.

In another aspect of the invention, the process includes an assessment overviewer of the assessment device displaying an assessment overview dashboard in a user interface of the assessment device. The assessment overview dashboard includes a selectable industrial machine schematic that includes sections that are selectable by an assessor. The process also includes the assessment overviewer receiving a selection of a section of the selectable industrial machine schematic that corresponds to an industrial machine section from the assessor. The process further includes a section assessor displaying a parts list in the user interface including a plurality of parts of the selected section and receiving a selection of a part of the plurality of parts from the assessor. The process yet further includes a part assessor of the assessment device displaying a part assessment interface for the selected part to the assessor in the user interface. The part assessor receives inputs from the assessor including measurements of the selected part requested by engineering instructions for the part and a part grade selection of the part. The process still further includes the assessment overviewer displaying the assessment overview dashboard including the selectable industrial machine schematic and indicating the state of completion of each section of the industrial machine using the appearance of each of the sections of the selectable industrial machine schematic. The process also includes an assessment report generator of the assessment system generating an assessment report after the assessment of each section of the industrial machine is completed. The assessment report generator uses the measurements and grading selections received from the assessor, and the images obtained from the image collector to generate the assessment report. The assessment report generator providing recommendations on whether to replace the parts assessed in the assessment report.

In yet another aspect of the invention, the assessment system includes an assessment device and an assessment report generator. The assessment device includes a user interface, an assessment overviewer, a section assessor, and a part assessor. The assessment overviewer displays an assessment overview dashboard in the user interface. The assessment overview dashboard includes a selectable industrial machine schematic that includes sections that are selectable by an assessor where each section corresponding to an industrial machine section, receives a selection of a section of the selectable industrial machine schematic, and indicates the state of completion of each section of the industrial machine using the appearance of each of the sections of the selectable industrial machine schematic. The section assessor displays a parts list in the user interface including a plurality of parts of the selected section and that receives a selection of a part of the plurality of parts from the assessor. The part assessor displays a part assessment interface for a selected part to the assessor in the user interface. The part assessor receives inputs from the assessor including measurements of the selected part and a part grade selection of the selected part. The assessment report generator that generates an assessment report after the assessment of each section of the industrial machine is completed. The assessment report generator using the measurements and grading selections received from the assessor, and the images obtained from the image collector to generate the assessment report. The assessment report generator providing recommendations on whether to replace the parts assessed in the assessment report.

In a further aspect of the invention, the process includes a protocol generator of the backend server obtaining a selectable industrial machine schematic that includes selectable sections. The process also includes the protocol generator generating a protocol structure for the assessment process. The protocol structure includes a hierarchical structure of the sections and the parts of the industrial machine and correlating each of the selectable sections with the sections of the hierarchical structure. The process further includes the protocol generator creating engineering instructions for each of the parts including identifying measurements of the parts to be taken by an assessor. The process yet further includes the protocol generator creating part grading instructions for each of the parts including establishing part grading parameters, which grading characterizations are needed for each part and which grading levels should be used for each part. The process still further includes the protocol generator assigning each engineering instruction and part grading instruction to one of the parts within the hierarchical structure. The process also includes an assessment overviewer of the assessment device displaying an assessment overview dashboard in a user interface of the assessment device. The assessment overview dashboard includes the selectable industrial machine schematic. The state of completion of each selectable section is indicated by the appearance of each of the selectable sections. The process also includes a part assessor of the assessment device displaying a part assessment interface for the selected part to the assessor in the user interface. The part assessment interface includes the engineering instructions and a part grading user interface. The part grading user interface provides the part grading parameters, the grading characterizations and the grading levels for a selected part. The part assessor receives inputs from the assessor including measurements of the selected part requested by the engineering instructions and a part grade selection. The process further includes an assessment report generator of the assessment system generating an assessment report after the assessment of each section of the industrial machine is completed. The assessment report generator uses the measurements and grading selections received from the assessor. The assessment report generator provides recommendations on whether to replace the parts assessed in the assessment report.

In still a further aspect of the invention, the assessment system includes a backend server, an assessment device, and an assessment report generator. The backend server includes a protocol generator that obtains a selectable industrial machine schematic that includes selectable sections, that generates a protocol structure for the assessment process, the protocol structure including a hierarchical structure of the sections and the parts of the industrial machine and correlating each of the selectable sections with the sections of the hierarchical structure, that creates engineering instructions for each of the parts including identifying measurements of the parts to be taken by an assessor, that creates part grading instructions for each of the parts including establishing part grading parameters, which grading characterizations are needed for each part and which grading levels should be used for each part, and that assigns each engineering instruction and part grading instruction to one of the parts within the hierarchical structure. The assessment device includes a user interface, an assessment overviewer, and a part assessor. The assessment overviewer displays an assessment overview dashboard in a user interface of the assessment device. The assessment overview dashboard includes the selectable industrial machine schematic. The state of completion of each selectable section is indicated by the appearance of each of the selectable sections. The part assessor displays a part assessment interface for the selected part to the assessor in the user interface. The part assessment interface includes the engineering instructions and a part grading user interface. The part grading user interface provides the part grading parameters, the grading characterizations and the grading levels for a selected part. The part assessor receives inputs from the assessor including measurements of the selected part requested by the engineering instructions and a part grade selection. The assessment report generator generates an assessment report after the assessment of each section of the industrial machine is completed. The assessment report generator uses the measurements and grading selections received from the assessor to generate the assessment report. The assessment report generator provides recommendations on whether to replace the parts assessed in the assessment report.

DETAILED DESCRIPTION

The systems and methods disclosed herein include an assessment system and process for assessing an industrial machine and its various sections, sub-sections, and parts. In embodiments, the assessment system includes an assessment device that includes an assessment overviewer and a part assessor. The assessment overviewer may provide an assessor with a selectable industrial machine schematic that illustrates the assessment status of each section of the industrial machine, such as by changing the appearance of each section based its assessment status, which may allow the assessor to determine the status of the assessment process quickly and efficiently. The part assessor may provide a part assessment interface with engineering instructions and a part grading user interface that may standardize the assessment of each part. Further, the part grading user interface may provide digital grading comparison images that can be compared to a digital image taken of the part, which may improve the accuracy and consistency of an assessor's part grading.

Figure 1:
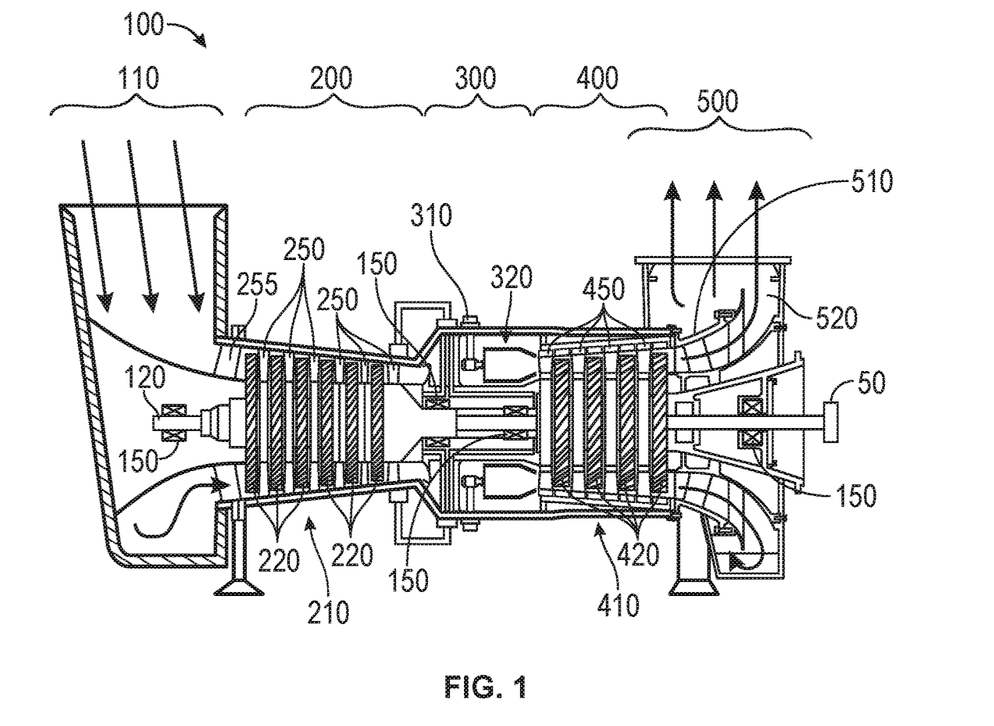
FIG. 1 is a schematic illustration of an exemplary industrial machine 100.

FIG. 1 is a schematic illustration of an exemplary industrial machine 100. The industrial machine 100 may be, inter alia, a gas turbine engine, a gas compressor, and the like. In the embodiment illustrated, the industrial machine 100 is a gas turbine engine and includes an inlet 110, a shaft 120, a compressor 200, a combustor 300, a turbine 400, an exhaust 500, and a power output coupling 50.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades 222. Stators 250 axially follow each of the compressor disk assemblies 220. Each compressor disk assembly 220 paired with the adjacent stators 250 that follow the compressor disk assembly 220 is considered a compressor stage. Some of the stators 250 may be variable guide vanes 253. Compressor 200 includes multiple compressor stages. Inlet guide vanes 255 axially precede the compressor stages. The variable guide vanes 253 and the inlet guide vanes 255 may rotate about a shaft so that the position of their airfoils may be changed depending on the operating conditions of the gas turbine engine.

The combustor 300 includes a combustion chamber 320 and one or more fuel injectors 310. The fuel injectors 310 may be upstream of the combustion chamber 320 and may be annularly arranged about the axis of the gas turbine engine.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 50 may be located at an end of shaft 120.

Figure 2:
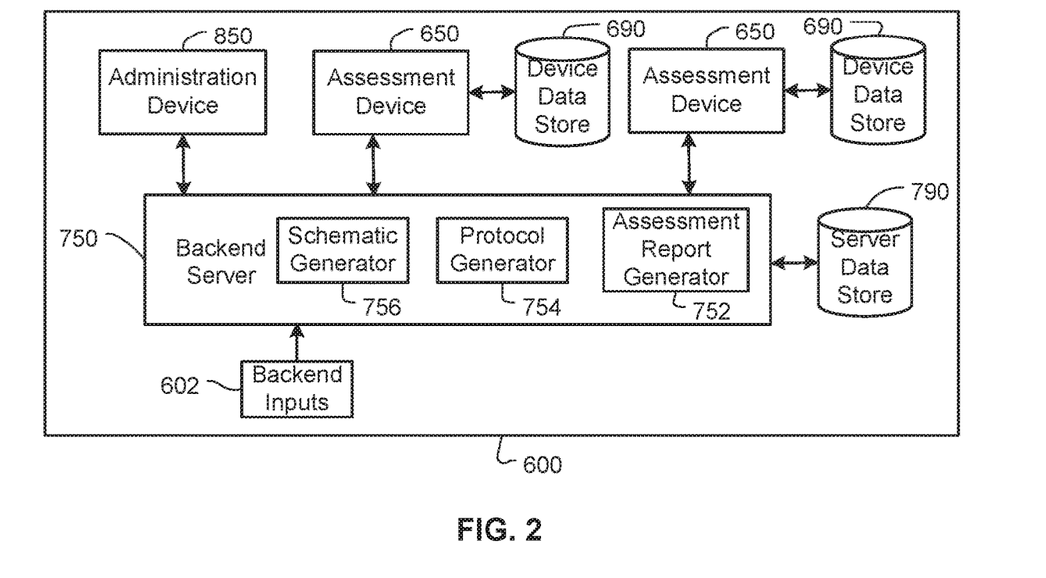
FIG. 2 is a schematic illustration of an assessment system for industrial machines, such as the industrial machine 100 of FIG. 1.

FIG. 2 is a schematic illustration of an assessment system 600 for industrial machines, such as the industrial machine 100 of FIG. 1. The assessment system 600 may include assessment devices 650, a device data store 690, an backend server 750, a server data store 790, backend inputs 602, and an administration device 850.

Figure 3:
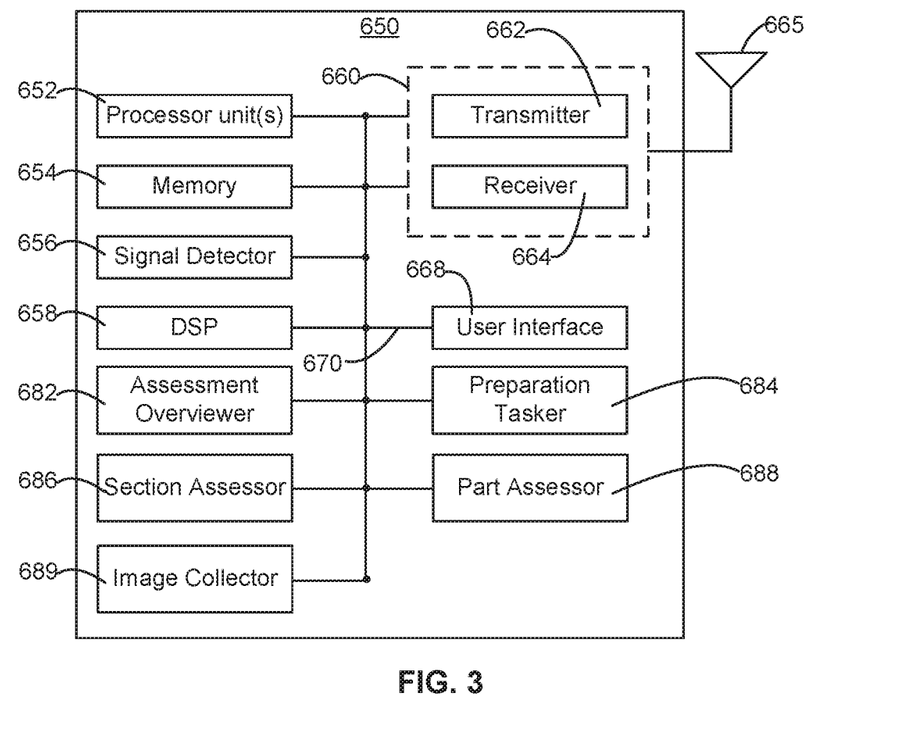
FIG. 3 is a functional block diagram of the assessment device of FIG. 2.

FIG. 3 is a functional block diagram of the assessment device 650 of FIG. 2. The assessment device 650 illustrated in FIG. 3 is an embodiment of a device that can be configured and can be operable to implement all or portions of the various methods described herein. The assessment device 650 can include one or more processors or processor units 652. The processor 652 can controls operation of the assessment device 650. The processor 652 can also be referred to as a central processing unit (CPU). The assessment device 650 can also have a memory 654 coupled to the processor 652. The memory 654 can include both read-only memory (ROM) and random access memory (RAM). The memory 654 can provide instructions and data to the processor 652. At least a portion of the memory 654 can also include non-volatile random access memory (NVRAM). The processor 652 can performs logical and arithmetic operations based on program instructions stored within the memory 654. The instructions in the memory 654 can be executable to implement the methods described herein. In some embodiments, the memory 654 can be implemented to store, for example, an assessment protocol for the assessment process and the assessment data obtained during the assessment process.

The processor 652 can include or be a component of a processing system implemented with one or more processors 652. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system and the memory 654 can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The assessment device 650 can also include a transmitter 662 and/or a receiver 664 to allow transmission and reception of data between the assessment device 650 and other portions of the assessment system 600, such as the backend server 750. The transmitter 662 and the receiver 664 can be combined into a transceiver 660. The assessment device 650 can also have one or more antennas 665 electrically coupled to the transceiver 660. The assessment device 650 can also include (not shown) multiple transmitters, multiple receivers, multiple transceivers, and/or multiple antennas 665 as needed for various communication standards.

The transmitter 662 can be configured to wirelessly transmit packets having different packet types or functions. For example, the transmitter 662 can be configured to transmit packets of different types generated by the processor 652. The receiver 664 can be configured to wirelessly receive packets having different packet types. In some examples, the receiver 664 can be configured to detect a type of a packet used and to process the packet accordingly.

In some embodiments, the transmitter 662 and the receiver 664 can be configured to transmit and receive information via wired or wireline systems or means.

The assessment device 650 can also include a digital signal processor (DSP) 658 for use in processing signals. The DSP 658 can be configured to generate a packet for transmission.

The assessment device 650 can further include a user interface 668. The user interface 668 can include, inter alia, a keypad, a display or a touch screen display. The user interface 668 can include any element or component that conveys information to a user of the assessment device 650 and/or receives input from the user.

The various components of the assessment device 650 can be coupled together by a bus system 670. The bus system 670 can include a data bus, for example, as well as a power bus, a control signal bus, and a status signal bus in addition to the data bus. The components of the assessment device 650 can be coupled together or accept or provide inputs to each other using some other mechanism.

The assessment device 650 guides an assessor, such as an engineer or a mechanic, through the assessment process and obtains assessment information during the assessment process. The assessment device 650 may also include an assessment overviewer 682, a preparation tasker 684, a section assessor 686, a part assessor 688, and an image collector 689. The image collector 689 may be a combination of hardware and software and may include, inter alia, an image sensor and a camera application. The assessment overviewer 682 provides a visual overview of the assessment process completion as well as navigation between assessment sections.

Figure 4:
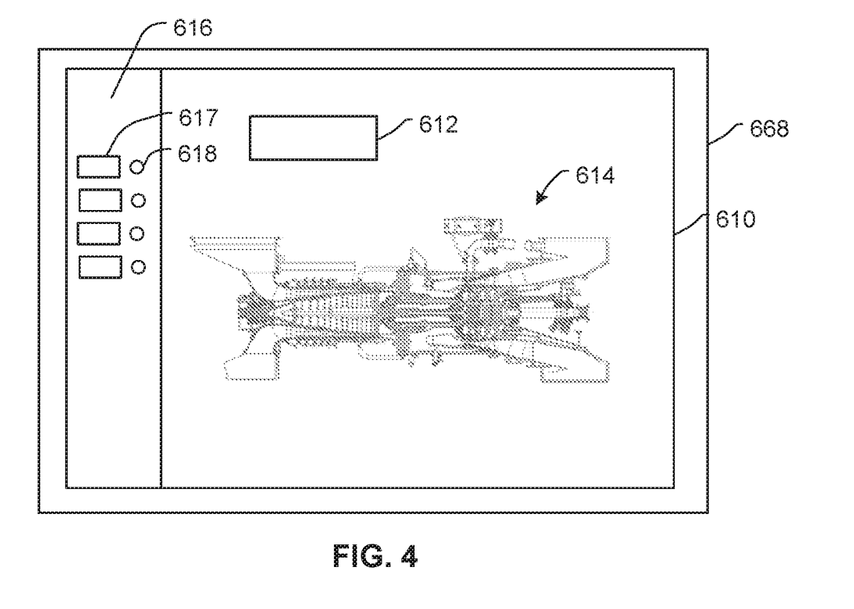
FIG. 4 is a schematic illustration of the user interface of FIG. 3 with a selectable gas turbine engine schematic.

FIG. 4 is a schematic illustration of the user interface 668 of FIG. 3 with an assessment overview dashboard 610. The assessment overview dashboard 610 may include a preparation task indicator 612, a selectable industrial machine schematic 614, and a collapsible list 616. The preparation task indicator 612 may indicate whether or not any preparation tasks that need to be performed prior to commencing the assessment have been completed by the assessor. This indication may be, inter alia, a change in appearance of the indicator, such as a change in color. The preparation task indicator 612 may be selectable to activate the preparation tasker 684.

The preparation tasker 684 may provide a list of tasks and sub-tasks that the assessor needs to complete prior to disassembling the industrial machine and commencing the assessment of the industrial machine.

The list of tasks and sub-tasks may include, inter alia, measurements to be taken and recorded by the assessor and images to be obtained using the image collector 689. Once the measurements are entered or the image is obtained for the task, the preparation tasker 684 may identify and indicate the task as complete. In some embodiments, not all tasks are essential and may be bypassed or indicated as complete by the assessor by the selection of a check box in the user interface. The preparation tasker 684 may require the assessor to enter an explanation of why the check box was selected.

Once the preparation tasker 684 identifies all preparation tasks and sub-tasks as complete, the assessment overviewer 682 modifies the preparation task indicator 612 in the assessment overview dashboard 610 to indicate that the preparation tasks are complete and enables the assessor to proceed with the guided assessment process, such as by enabling the selection of sections in the selectable industrial machine schematic 614 and selection from the collapsible list 616.

The selectable industrial machine schematic 614 may be interactive and may show the progress of the assessment process. The selectable industrial machine schematic 614 may be, inter alia, a cross-section of the industrial machine as illustrated in FIG. 4 or a schematic of the industrial machine as illustrated in FIG. 1. In embodiments, the selectable industrial machine schematic 614 is a scalable vector graphics (SVG) image that may facilitate the assessor's interactivity with the selectable industrial machine schematic 614. The assessment overviewer 682 may modify the selectable industrial machine schematic 614 to indicate the state of completion of each section, such as whether the section has not been completed, is in progress, or has been completed. The appearance of each section, such as the color of the section or of the lines illustrating the section, may be changed by the assessment overviewer 682 depending on which state of completion the section is in. Each section may correspond with a section of the industrial machine, such as the various sections described and indicated with regards to FIG. 1 including the inlet 110, the inlet guide vanes 255, the compressor rotor assembly 250, and the like.

The collapsible list 616 may include a navigation list of components 617 including sections, sub-sections and parts. The collapsible list 616 may initially show the sections of the industrial machine 100, which may then be expanded to show the sub-sections and parts for each section. The collapsible list 616 may also include a completion indicator 618 next to each component 617. The appearance of the completion indicator 618 may indicate the state of completion of each component, such as whether a task associated with the component 617 has not been completed, is in progress, or has been completed. The appearance of each completion indicator 618, such as the color of the completion indicator 618, may be changed by the assessment overviewer 682 depending on which state of assessment the component 617 is in.

In embodiments, the collapsible list 616 may be hidden from the assessment overview dashboard 610.

Figure 5:
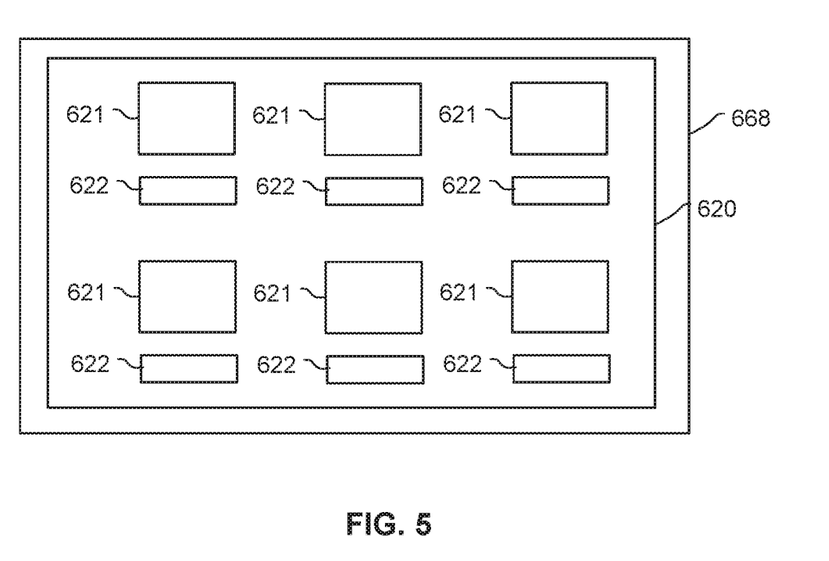
FIG. 5 is a schematic illustration of the user interface of FIG. 3 with a parts list.

FIG. 5 is a schematic illustration of the user interface of FIG. 3 with a parts list 620. When a section is selected from the selectable industrial machine schematic 614 or from the collapsible list 616 the section assessor 686 may display a parts list 620 in the user interface 668. The parts list 620 may include all of the parts associated with the section selected and may include a part descriptor 621 and a part indicator 622 for each part. The part descriptor 621 may include, inter alia, a character string identifying the part, such as the part name and part number, an image identifying the part, or a combination thereof.

The appearance of the part indicator 622 may indicate the state of assessment of each part, such as whether the assessment tasks associated with the part have not been completed, are in progress, or have been completed. The appearance of each part indicator 622, such as the color of the part indicator 622, may be changed by the section assessor 686 depending on which state of assessment the part is in. While the part descriptor 621 and the part indicator 622 are shown separate in FIG. 5, in some embodiments, the part descriptor 621 and the part indicator 622 may be combined, such as the part indicator 622 being the boarder around the part descriptor 621.

Figure 6:
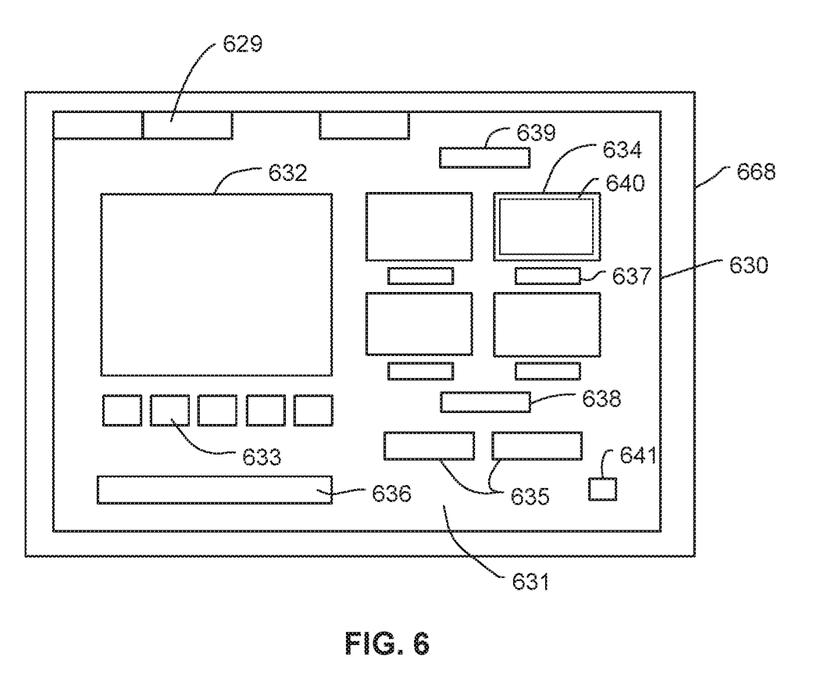
FIG. 6 is a schematic illustration of the user interface of FIG. 3 with a part grading interface.

FIG. 6 is a schematic illustration of the user interface of FIG. 3 with a part assessment interface 630. When a part of the industrial machine is selected, such as by selecting the part descriptor 621 from the parts list 620 or by selecting a component 617 within the collapsible list 616 that identifies the part, the part assessor 688 may display a part assessment interface 630. The part assessment interface 630 provides tasks for the assessor to complete, which may be separated into engineering instructions and part grading tasks. The engineering instructions may include tasks that are performed at the various stages of disassembly of the part. The engineering instructions may be separated into subsets of tasks, such as pre-disassembly tasks, during assembly tasks, post-disassembly tasks, and condition based lifting tasks.

In the embodiment illustrated in FIG. 6, the task subsets of engineering instructions and the part grading tasks are separated into selectable tabs 629. The selectable tabs 629 may be situated in the desired order of completion. The part assessor 688 may display a list of tasks and instructions when a selectable tab 629 of engineering instructions is selected by the assessor. The list of tasks and instructions may include, inter alia, measurements to be taken and recorded by the assessor, images to be obtained using the image collector 689. Once the measurements are entered or the image is obtained for the task, the part assessor 688 may identify and indicate the task as complete. In some embodiments, not all tasks are essential and may be bypassed and indicated as complete by the assessor by the selection of a check box. The part assessor 688 may require the assessor to enter an explanation of why the check box was selected.

In FIG. 6, an embodiment of a part grading user interface 631 displayed by the part assessor 688 when the associated selectable tab 629 is selected is shown. The part grading user interface 631 may include a part image window 632, secondary image windows 633, an assessment annotator 636, a grading characterizer 639, grading comparison images 634, grading level identifiers 637, a grading characterization indicator 638, a grading characterization selector 635, and a grading selection indicator 640.

The part assessor 688 shows an image of the part once it is obtained in the part image window 632. When an image of the part has not been obtained, the part assessor 688 may show an option to obtain an image in the part image window 632. The part assessor 688 may activate the image collector 689 when the part image window 632 without a part image shown is selected. The assessor may use the image collector 689 to create an image of the part, which the image collector 689 mat provide to the part assessor 688 and may subsequently be displayed by the part assessor 688 in the part image window 632. Subsequent images may also be obtained and shown in the secondary image windows 633. An image shown in the secondary image windows 633 by the part assessor 688 may be selected by the assessor. Upon selection, the part assessor 688 may display the selected image in the part image window 632.

The grading characterization identifier 638 may indicate how many grading characterizations there are to be performed for the given part and which characterization is currently being performed. The assessor may switch between grading characterizations using the grading characterization selector 635. If the part only requires a single grading the grading characterization identifier 638 and the grading characterization selector 635 may not be shown by the part assessor 688.

The grading characterizer 639 may identify which type of characterization is currently being graded. Grading characterizations include, inter alia, deposits, wear, corrosion, fatigue, pitting, coating loss, material loss, varnishing, scoring, impact damage, rub, and coking.

The part assessor 688 may restrict access to certain subsets of the engineering instructions and to the part grading tasks until any prerequisite tasks are completed by the assessor. For example, the tab for any pre-disassembly tasks may be the only selectable tab 629 accessible until all of the pre-disassembly tasks have been completed. Once the assessor has completed all of the pre-disassembly tasks, the part assessor 688 may activate and allow selection of the other selectable tabs 629, providing the assessor access to the other engineering instructions and to the part grading tasks.

The part assessor 688 provides a number of grading comparison images 634 for the assessor to compare to the image provided in the part image window 632. The part assessor 688 may provide a grading level identifier 637 adjacent to each grading comparison image 634 which identifies the grading level associated for the adjacent grading comparison image 634. The grading levels for the part that may be shown in the grading level identifiers 637 include, inter alia, none, light, moderate, heavy, good, fair, poor, and critical. The assessor may then grade the part by comparing the image in the part image window 632 with the grading comparison images 634 and by selecting the grading comparison image 634 that best identifies the grade for the given part. The part assessor 688 may show a grading selection indicator 640 to identify to the assessor which grading comparison image 634 was selected. The grading selection indicator 640 may be, inter alia, a highlighted border around the grading comparison image 634, a check mark, or a combination thereof.

In some embodiments, the part grading user interface 631 may also include a check box 641 where the assessor can indicate completion of the part grading to the part assessor 688. In other embodiments, the part assessor 688 may determine completion of the part grading based on whether or not an image is obtained and shown in the part image window 632, annotations have been made in the assessment annotator 636 by the assessor, and a grading selection has been made for each grading characterization available in the part grading user interface 631 for the given part. The image in the part image window 632 may be edited, such as to add annotations and other marks to highlight any noteworthy grading characteristics shown in the image. Further, the assessor may provide assessment and grading notes to the part assessor 688 within the assessment annotator 636, which may receive character strings from the assessor.

The engineering instruction tabs may include, inter alia, part image windows 632, assessment annotators 636, and check boxes 641 along with the various instructions provided for the assessor, such as which image to obtain and which measurement to take and record into the assessment annotator 636.

Referring to FIG. 2, the device data store 690 may be used by the assessment device 650 to store, inter alia, the assessment information, such as the information provided by the assessor in the assessment annotators 636 and the images obtained by the image collector 689 during the assessment process. The device data store 690 may also be used by the assessment device 650 to store the various details, instructions, and protocols for the assessment process including the preparation tasks, the selectable industrial machine schematic 614, the parts list 620, the part assessment engineering instructions and the part grading information for the assessment process of the industrial machine 100.

The backend server 750 is an embodiment of a device that can be configured and can be operable to implement all or portions of the various processes described herein. The backend server 750 may include, inter alia, one or more processors or processor units and memory, which may be the same or similar to the processor 652 and memory 654 for the assessment device 650 described above. While the backend server 750 is shown as a single device, the backend server 750 may include a network of multiple devices, such as servers, computers, and the like, where each may include, inter alia one or more processors or processor units and memory.

The backend server 750 may also include an assessment report generator 752, a protocol generator 754, and a schematic generator 756. The Assessment report generator 752 may obtain all of the assessment information, such as the information provided by the assessor in the assessment annotators 636 and the images obtained by the image collector 689 during the assessment process from the assessment device 650, such as from the device data store 690 and may generate an assessment report about the condition of the industrial machine 100, the various sections of the industrial machine, and the condition of each part assessed by the assessor. The Assessment report generator 752 may also determine and provide recommendations in the assessment report on whether to replace a part or may provide an estimate on when a part will need to be replaced based on the assessment information provided by the assessor. The Assessment report generator 752 may also provide the reasoning for the replacement with the recommendation using, inter alia, the images obtained and the information provided by the assessor in the assessment annotators 636. The Assessment report generator 752 may use, inter alia, empirical data and condition based lifting processes to determine and provide the recommendation. The empirical data and condition based lifting information for the condition based lifting processes may be provided by the backend inputs 602 or may be stored locally by the backend server 750.

The assessment report may be an equipment condition report, a condition assessment report, a baseline assessment report, and the like. The assessment report may include, inter alia, recommendations determined by the assessment report generator 752, the images obtained by the image collector 689 during the assessment process, and the information provided by the assessor in the assessment annotators 636 in response to the engineering instructions.

The server data store 790 may be used by the backend server 750 to store, inter alia, the assessment information obtained from the assessment devices 650 and to store the various protocols, details, and instructions for the assessment process for various industrial machines 100, including different model numbers of similar industrial machines 100. These protocols, details, and instructions may be obtained from the backend server 750 by an assessment device 650 prior to an assessor commencing a new assessment of an industrial machine 100. The server data store 790 may also store the various protocols, details, and instructions for the Assessment report generator 752 needed for the Assessment report generator 752 to determine recommendations and generate the report.

While the Assessment report generator 752 is implemented on the backend server 750 in the embodiment illustrated, in other embodiments, the Assessment report generator 752 may be implemented on the assessment device 650, on the administration device 850, or on a combination of the devices of the assessment system 600.

The protocol generator 754 may prepare, generate, and modify the various protocols, protocol structures, details, and instructions for the assessment process of each industrial machine 100 including, inter alia, the various protocols, details, and instructions described herein. The protocol structure generated may include sections of the industrial machine, the order of those sections, creating tasks, assigning tasks within the protocol structure, grading configurations, grading images, and the like. The protocol generator 754 may receive inputs, such as images, task descriptions, engineering instructions, and the like from an administrator.

The protocol generator 754 may organize the inputs provided to establish the protocol, structures, and details of the user interface components, such as for the selectable industrial machine schematic 614 and the part grading user interface 631. The protocol generator 754 may also correlate the various selectable sections of the selectable industrial machine schematic 614 with the various sections within the structure of the protocol.

The administrator may access the backend server 750 directly or over a network through an administration device 850. The administration device 850 may be remote to the backend server 750. The protocol generator 754 may generate a new protocol for an industrial machine from scratch or may be modified from an existing protocol.

The schematic generator 756 may generate the selectable industrial machine 614 schematic 614. The schematic generator 756 may convert a schematic image of the industrial machine into an SVG image and separate the image into interactive sections that can be selected and modified as described herein. While the schematic generator 756 is implemented on the backend server 750 in the embodiment shown, the schematic generator 756 may be a separate component or may be implemented on a separate device.

Although a number of separate components are illustrated in FIG. 2, one or more of the components can be combined or commonly implemented.

INDUSTRIAL APPLICABILITY

Industrial machines often operate under harsh conditions at high speeds, temperatures, and pressures. Over time the various components or parts may become damaged by fatigue, wear, corrosion, and the like. The various sections, sub-sections, and components may be assessed to determine when these components should be replaced.

Figure 7:
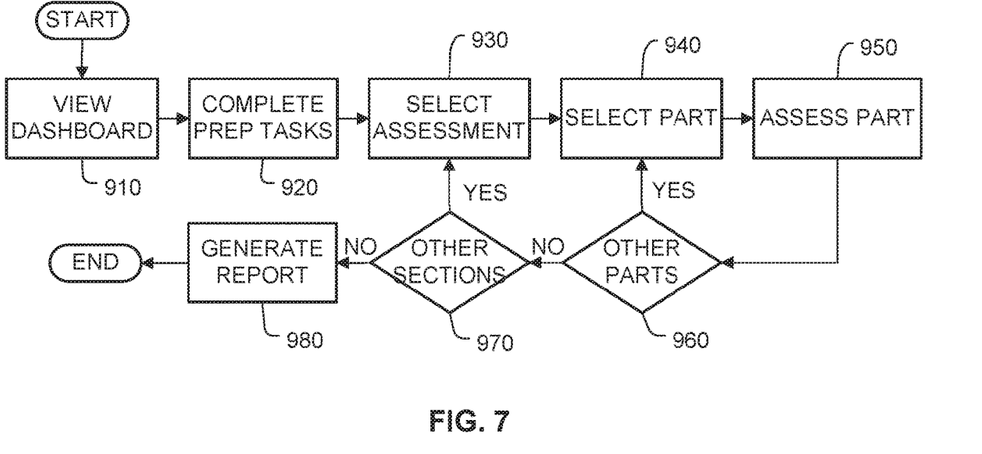
FIG. 7 is a flowchart of an assessment process for assessing an industrial machine using the assessment device of FIG. 3.

FIG. 7 is a flowchart of an assessment process for assessing an industrial machine 100 using the assessment device 650 of FIG. 3. In embodiments, the process includes accessing and viewing the assessment overview dashboard 610 at step 910. As described herein, the assessment overview dashboard 610 may include a selectable industrial machine schematic 614 and a collapsible list 616 that illustrate how much of the assessment process has been completed. Once the assessment process is started, the assessment overviewer 682 may display the assessment overview dashboard 610 to the assessor and receive inputs from the assessor, such as a selection of preparation task indicator 612 or of a section of the selectable industrial machine schematic 614.

The process may also include completing the preparation tasks at step 920. The assessment overview dashboard 610 may include a preparation task indicator 612 that illustrates whether the preparation tasks have been completed. The preparation task indicator 612 may be selectable by the assessor, which may activate the preparation tasker 684 that provides the engineering instructions for the preparation tasks to the assessor. Once the preparation tasks are completed, the preparation tasker 684 may return the assessor to the assessment overview dashboard 610. The preparation tasker 684 may receive inputs from the assessor, such as character strings within assessment annotators 636 that provide the information requested in the engineering instructions and images obtained with the image collector 689. The preparation tasks may need to be completed prior to selecting a section to assess. The assessment overviewer 682 may prevent the assessor from selecting a section from the selectable industrial machine schematic 614 until the assessor has completed the preparation tasks.

The process may further include selecting a section to assess at step 930. The assessment overviewer 682 may receive the selection within the selectable industrial machine schematic or the collapsible list 616. The section assessor 686 may display a parts list 620 for the section selected, which shows all of the parts in the selected section that need to be assessed. The section assessor 686 may display the part descriptor 621 for each part and the part indicator 622 for each part that shows whether or not the associated part assessment has been completed.

The process yet further includes selecting a part to assess at step 940 and assessing the part at step 950. The section assessor 686 may receive a selection of a part from the assessor in the parts list 620. Upon selection, the part assessor 688 displays the part assessment interface 630 including one or more selectable tabs 629 including engineering instructions and a selectable tab 629 that includes the part grading user interface 631.

The part assessor 688 receives inputs from the assessor including character strings within assessment annotators 636 that provide the information requested in the engineering instructions and information related to the part grading and images obtained with the image collector 689. In some embodiments, the part assessor 688 receives inputs from the assessor to annotate an image obtained with the image collector 689. The part assessor 688 may also receive a grading selection from the assessor, where a grading comparison image 634 is selected by the assessor that best identifies the condition of the part that may be shown in the obtained from the image collector 689 and shown in the part image window 632 by the part assessor 688.

The part assessment interface 630, and in particular the part grading user interface 631, may standardize the assessment process for each part including the grading levels of each part. Further, the use of digital images for both the grading comparison images 634 and the part images obtained and shown in the part image window 632 may provide for a more detailed comparison between those images and a more accurate determination of the grade level of each part.

The process also includes determining whether other parts of the section need to be reviewed at step 960. Upon completion of the part assessment, either identified by the assessor or determined by the part assessor 688, the section assessor 686 may return the assessor to the parts list 620 and display the parts list 620 from the section that the completed part assessment was from. If the section includes other parts to assess then steps 940 to 960 may be repeated until all of the parts in the section are complete. If the section does not include other parts to assess then the assessment overviewer 682 may display the assessment overview dashboard 610 to the assessor.

In some embodiments, the section assessor 686 may determine that all of the parts within the section have been completed and the assessment overviewer 682 may display the assessment overview dashboard 610 without the section assessor 686 displaying the parts list 620 and without receiving an input from the assessor. In other embodiments, the assessor makes the determination from the information displayed on the parts list 620 and the section assessor 686 receives an input from the assessor and the assessment overviewer 682 displays the assessment overview dashboard 610.

The process may yet further include determining whether other sections are not complete, such as not started or partially completed, at step 970. This determination may be made by the assessor, such as by reviewing the contents of the assessment overview dashboard 610, such as the selectable industrial machine schematic 614, or may be made by the assessment overviewer 682. If one or more sections are not complete, then steps 930 to 970 may be repeated until all of the sections are complete. If all of the sections are completed, the assessment overviewer 682 may provide for and receive an input to complete the assessment of the industrial machine.

The selectable industrial machine schematic 614 may allow an assessor to efficiently review the completion status of the assessment process and of each section of the industrial machine based on the appearances of each section within the selectable industrial machine schematic 614 and may be able to quickly navigate to the incomplete sections by making a selection within one of those sections. For each step of the process, the assessor may input information, such as character strings, and may make selections, such as selecting a section of the selectable industrial machine schematic 614, selecting a part descriptor 621 from the parts list 620, or selecting a grading comparison image 634.

The process may still further include generating the assessment report at step 980. The assessor may instruct the assessment overviewer 682 to generate the assessment report, such as by selecting an option displayed by the assessment overviewer 682 in the user interface 668. The assessment overviewer 682 may provide for and receive an input from the assessor to generate the assessment report, whereupon the Assessment report generator 752 creates the assessment report using the information obtained by the assessment device 650 during the assessment process, such as the information requested in the engineering instructions, the part grading information, and the images obtained with the image collector 689. In some embodiments, the Assessment report generator 752 is implemented by the backend server 750, as described above, and the information obtained by the assessment device 650 is transferred to the backend server 750 for the Assessment report generator 752 to use while generating the assessment report. In other embodiments, the Assessment report generator 752 is implemented on the assessment device 650. In these embodiments, the assessment report may be transferred to the backend server 750 after the assessment report is generated. Generating the assessment report with the Assessment report generator 752 may reduce variations within assessment reports and may standardize the layout and overall appearance of the assessment reports generated and provided to the industrial machine operators. Further, generating assessment reports with the Assessment report generator 752 may save the assessor hours since the assessment report is generated without any further input by the assessor.

Figure 8:
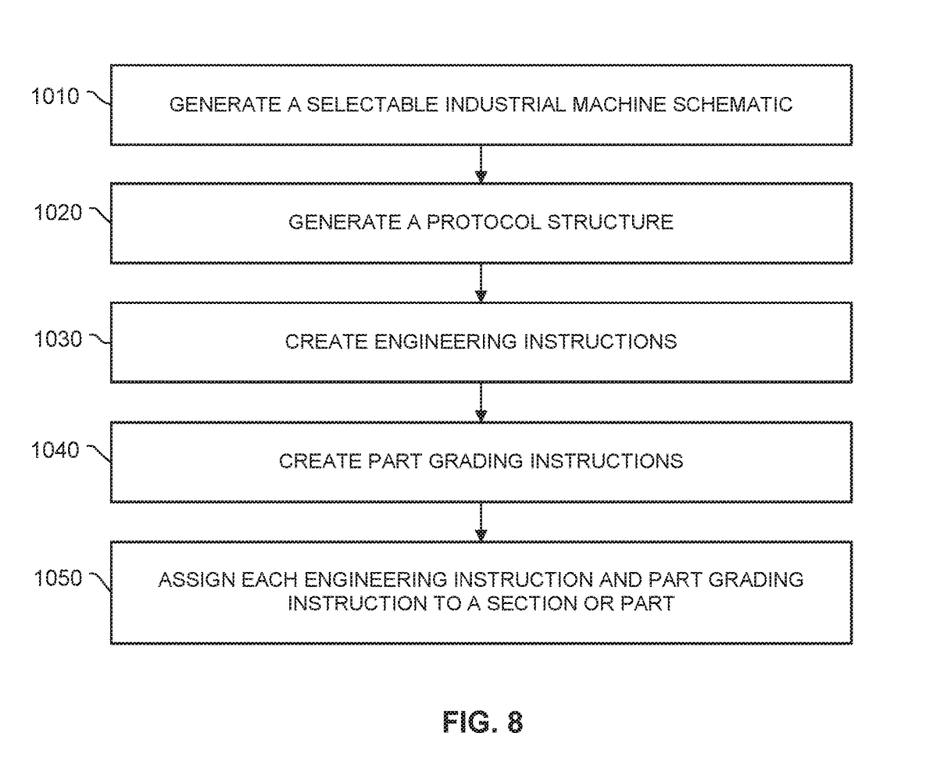
FIG. 8 is a flowchart of a method for generating an assessment protocol.

In some embodiments, the assessment process includes generating the assessment protocol. FIG. 8 is a flowchart of a method for generating an assessment protocol. The method may include obtaining a selectable industrial machine schematic 614 at step 1010. The protocol generator 754 may obtain the selectable industrial machine schematic 614 from the schematic generator 756 or from a device separate from the assessment system 600.

In embodiments, the schematic generator 756 may generate the selectable industrial machine schematic 614. Step 1010 may include converting a schematic image of the industrial machine into an SVG image and creating selectable sections within the image, and in particular within the actual schematic, such as a cross-section, of the industrial machine.

The method may also include generating a protocol structure at step 1020. Generating the protocol structure may include creating a hierarchical structure that matches the structure of the various sections and parts of the industrial machine 100. For example, the hierarchical structure may include sections and sub-sections of the gas turbine engine described in conjunction with FIG. 1, such as the compressor 200, and may further include parts within those sections, such as the inlet guide vanes 255 and the compressor stationary vanes 250. In some embodiments, the hierarchical structure may include a section for the preparation tasks. The hierarchical structure may be created from scratch or may be copied and obtained from an existing assessment protocol and then modified for the assessment process being generated.

The method may further include creating engineering instructions for the various sections and parts within the hierarchical structure at step 1030. The engineering instructions may include tasks for an assessor to complete, which may include requests for measurements to be provided within assessment annotators 636 and to obtain images using the image collector 689. In some embodiments, a selection of the engineering instructions may be copied from an existing assessment protocol, which may then be modified for the assessment process being generated. In some embodiments, step 1030 includes creating engineering instructions for preparation tasks that must be completed prior to disassembly of the industrial machine 100 and prior to commencing the remainder of the assessment of the industrial machine 100.

The method may still further include creating part grading instructions for the parts within the hierarchical structure at step 1040. Creating the part grading instructions for the parts may include establishing part grading parameters, which grading characterizations are needed for each part and which grading levels should be used for each part. Creating the part grading instructions for the parts may further include selecting an image for each grading level and providing a grading level identifier 637 for each of the grading levels.

In embodiments, creating the part grading instructions for each of the parts includes generating a protocol for the part assessor 688 to provide a part grading user interface 631 with the part assessment interface 630, the part grading user interface 631 including a part image window 632 that displays an image of the selected part, grading comparison images that illustrate the grading levels for the selected part, and grading level identifiers 637 that identify the grading level of each of the grading comparison images, wherein the part grade selection is determined by comparing the image of the selected part with the grading comparison images.

The method may yet further include assigning each engineering instruction and part grading instruction to a section or part within the hierarchical structure at step 1050. In some embodiments, the engineering instructions or part grading instructions may be the same for multiple parts. In these embodiments, an engineering instruction or part grading instruction may be assigned to multiple parts within the hierarchical structure. In embodiments, where the hierarchical structure is copied from an existing assessment protocol, engineering instructions and part grading instructions may also be copied and obtained by the protocol generator 754 from an existing assessment protocol. Step 1050 may include reassigning some of the engineering instructions and part grading instructions within the modified hierarchical structure.

Steps 1020 to 1050 may be performed by the protocol generator 754 based on inputs from an administrator.

The method illustrated in FIG. 8 is subject to many variations, including adding, omitting, reordering, or altering blocks. Additionally, blocks may be performed concurrently. For example, the engineering instructions and the part grading instructions can be created and assigned within the hierarchical structure as the protocol structure is being generated.

In some embodiments, the assessment device 650 obtains, such as by downloading, an assessment protocol for the assessment process from the backend server 750 at the start of the process and prior to viewing the assessment overview dashboard 610 at step 910.

In embodiments, the method includes the protocol generator 754 generating a protocol for the section assessor 686 to display all of the parts of a selected section in the parts list 620 that includes a part descriptor 621 and a part indicator 622 for each of the parts where the section assessor 686 indicates assessment of a previously selected part as complete with the part indicator 622 after the part assessor 688 receives all of the measurements requested by the engineering instructions and the part grade selection from the assessor.

Creating an assessment protocol for each model and model variation of an industrial machine may standardize the assessment process for each model and model variation and across multiple models. Further, any updates to the assessment process become integrated within the assessment process immediately as any new or updated engineering instructions may be picked up by the assessment device 650 prior to commencing a new assessment Those of skill will appreciate that the various illustrative logical blocks and algorithm steps described in connection with the embodiments disclosed herein can be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a block or step is for ease of description. Specific functions or steps can be moved from one block without departing from the invention.

The various illustrative logical blocks described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor (e.g., of a computer), or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A process for assessing an industrial machine using an assessment system including an assessment device, the process comprising:
    an assessment overviewer of the assessment device displaying an assessment overview dashboard in a user interface of the assessment device, the assessment overview dashboard including a selectable industrial machine schematic that includes sections that are selectable by an assessor;
    the assessment overviewer receiving a selection of a section of the selectable industrial machine schematic that corresponds to an industrial machine section from the assessor;
    a section assessor displaying a parts list in the user interface including a plurality of parts of the selected section and receiving a selection of a part of the plurality of parts from the assessor;
    a part assessor of the assessment device displaying a part assessment interface for the selected part to the assessor in the user interface, wherein the part assessor receives inputs from the assessor including a part grade selection of the part and measurements of the selected part requested by engineering instructions for the part;
    the assessment overviewer displaying the assessment overview dashboard including the selectable industrial machine schematic and indicating a state of completion of each section of the industrial machine using an appearance of each of the sections of the selectable industrial machine schematic; and
    an assessment report generator of the assessment system generating an assessment report after the assessment of each section of the industrial machine is completed, the assessment report generator uses the measurements and part grade selections received from the assessor, and images obtained from an image collector of the assessment device to generate the assessment report, the assessment report generator determining recommendations on whether to replace the parts assessed in the assessment report.

2. The process of claim 1, wherein the assessment overview dashboard includes a preparation task indicator that indicates whether preparation tasks that include engineering instructions that need to be completed prior to the assessor disassembling the industrial machine have been completed, and wherein the assessment overviewer prevents selection of the sections of the selectable industrial machine schematic until the preparation tasks have been completed.

3. The process of claim 2, further comprising:
    a preparation tasker of the assessment device providing the engineering instructions that need to be completed prior to the assessor disassembling the industrial machine and receiving inputs from the assessor including measurements of the industrial machine requested by the engineering instructions.

4. The process of claim 1, wherein the assessment overview dashboard includes a collapsible list, the collapsible list including a navigation list of components that displays each of the sections of the industrial machine and wherein the collapsible list can be expanded to display the plurality of parts associated with each of the sections of the industrial machine.

5. The process of claim 4, wherein the collapsible list can be hidden from the assessment overview dashboard.

6. The process of claim 4, wherein the collapsible list includes a completion indicator for each of the components, the completion indicator indicates the state of completion for the component to which the completion indicator corresponds.

7. The process of claim 1, further comprising the section assessor displaying the parts list of the selected section, the parts list including a part indicator for each of the plurality of parts, wherein the section assessor indicates assessment of the previously selected part as complete after the part assessor receives all of the inputs requested by the engineering instructions and the part grade from the assessor.

8. A process for assessing an industrial machine using an assessment system including an assessment device, the process comprising:
    an assessor accessing and viewing an assessment overview dashboard provided by an assessment overviewer of the assessment device, the assessment overview dashboard including a selectable industrial machine schematic that includes sections that are selectable by the assessor;
    the assessor selecting a section of the selectable industrial machine schematic that corresponds to an industrial machine section;
    the assessor selecting a part to assess from a parts list of the selected section displayed by a section assessor of the assessment device;
    the assessor assessing the selected part including the assessor grading the selected part and the assessor completing engineering instructions which includes inputting measurements into assessment annotators;
    the assessor determining whether other sections are not complete by returning to the assessment overview dashboard and reviewing the selectable industrial machine schematic, an appearance of each of the sections of the selectable industrial machine schematic indicating a state of completion of each of the sections, wherein the assessor selects the sections and assesses parts shown in the parts list for each section until the assessment is complete; and
    the assessor instructing the assessment system to generate an assessment report, wherein the assessment system uses inputs from the assessor including the measurements and grading provided by the assessor to generate the assessment report, and wherein the assessment report includes recommendations on whether to replace the parts assessed.

9. The process of claim 8, wherein the assessment overview dashboard includes a preparation task indicator that indicates whether preparation tasks including engineering instructions that need to be completed prior to the assessor disassembling the industrial machine have been completed, and wherein the assessment overviewer prevents selection of the sections of the selectable industrial machine schematic until the preparation tasks have been completed.

10. The process of claim 9, further comprising the assessor completing preparation tasks provided by a preparation tasker of the assessment device.

11. The process of claim 8, wherein the assessment overview dashboard includes a collapsible list, the collapsible list including a navigation list of components that displays each of the sections of the industrial machine and wherein the collapsible list can be expanded to display the plurality of parts associated with each of the sections of the industrial machine.

12. The process of claim 11, wherein the collapsible list can be hidden from the assessment overview dashboard.

13. The process of claim 11, wherein the collapsible list includes a completion indicator for each of the components, the completion indicator indicates the state of completion for the component to which the completion indicator corresponds.

14. The process of claim 8, further comprising the assessor determining whether other parts of the section need to be reviewed by returning to the parts list and reviewing a part indicator for each of the parts in the parts list that indicates whether the part has been assessed, wherein the assessor assesses each of the parts in the parts list until each of the parts is indicated as complete by the part indicator.

15. An assessment system for assessing an industrial machine, the assessment system comprising:
　an assessment device including
　　a user interface,
　　an assessment overviewer that displays an assessment overview dashboard in the user interface, the assessment overview dashboard including a selectable industrial machine schematic that includes sections that are selectable by an assessor, each of the sections corresponding to an industrial machine section, that receives a selection of one of the sections of the selectable industrial machine schematic; and that indicates a state of completion of each of the sections of the industrial machine using an appearance of each of the sections of the selectable industrial machine schematic,
　　a section assessor that displays a parts list in the user interface including a plurality of parts of the selected section and that receives a selection of a part of the plurality of parts from the assessor, and
　　a part assessor that displays a part assessment interface for a selected part to the assessor in the user interface, wherein the part assessor receives inputs from the assessor including measurements of the selected part and a part grade selection of the selected part; and
　an assessment report generator that generates an assessment report after the assessment of each section of the industrial machine is completed, the assessment report generator using the measurements and part grade selections received from the assessor, and images obtained from an image collector to generate the assessment report, the assessment report generator determining recommendations on whether to replace parts assessed in the assessment report.

16. The assessment system of claim 15, wherein the assessment overview dashboard includes a preparation task indicator that indicates whether preparation tasks including engineering instructions that need to be completed prior to the assessor disassembling the industrial machine have been completed, and wherein the assessment overviewer prevents selection of the sections of the selectable industrial machine schematic until the preparation tasks have been completed.

17. The assessment system of claim 16, further comprising:
　a preparation tasker that provides the engineering instructions that need to be completed prior to the assessor disassembling the industrial machine and that receives inputs from the assessor including measurements requested by the preparation tasker in the engineering instructions.

18. The assessment system of claim 15, wherein the assessment overview dashboard includes a collapsible list, the collapsible list including a navigation list of components that displays each of the sections of the industrial machine and wherein the collapsible list can be expanded to display the plurality of parts associated with each of the sections of the industrial machine.

19. The assessment system of claim 18, wherein the collapsible list can be hidden from the assessment overview dashboard.

20. The assessment system of claim 18, wherein the collapsible list includes a completion indicator for each of the components, the completion indicator indicates the state of completion for the component to which the completion indicator corresponds.

* * * * *